United States Patent
Drewes et al.

(10) Patent No.: US 11,722,018 B2
(45) Date of Patent: Aug. 8, 2023

(54) ELECTRIC MOTOR WITH SLANTED STATOR AND/OR ROTOR CONTAINING AT LEAST ONE LAYER OF A COMPOSITE MATERIAL

(71) Applicants: ThyssenKrupp Steel Europe AG, Duisburg (DE); thyssenkrupp AG, Essen (DE)

(72) Inventors: Stephan Drewes, Mönchengladbach (DE); Tobias Lewe, Münster (DE); Florian Herget, Bochum (DE)

(73) Assignees: thyssenKrupp Steel Europe AG, Duisburg (DE); thyssenKrupp AG, Essen (DE)

( * ) Notice: Subject to any disclaimer, the term of this patent is extended or adjusted under 35 U.S.C. 154(b) by 0 days.

(21) Appl. No.: 17/041,623

(22) PCT Filed: Mar. 14, 2019

(86) PCT No.: PCT/EP2019/056464
§ 371 (c)(1),
(2) Date: Sep. 25, 2020

(87) PCT Pub. No.: WO2019/185365
PCT Pub. Date: Oct. 3, 2019

(65) Prior Publication Data
US 2021/0028658 A1    Jan. 28, 2021

(30) Foreign Application Priority Data
Mar. 29, 2018   (DE) ............... 10 2018 204 876.2

(51) Int. Cl.
H02K 1/04      (2006.01)
H02K 1/17      (2006.01)
H02K 5/24      (2006.01)
H02K 1/26      (2006.01)

(52) U.S. Cl.
CPC .............. *H02K 1/04* (2013.01); *H02K 1/17* (2013.01); *H02K 1/26* (2013.01); *H02K 5/24* (2013.01)

(58) Field of Classification Search
CPC ............. H02K 1/04; H02K 1/17; H02K 5/24
USPC ....... 310/216.001, 216.016, 216.017, 156.47
See application file for complete search history.

(56) References Cited

U.S. PATENT DOCUMENTS

| | | | |
|---|---|---|---|
| 6,191,510 B1 * | 2/2001 | Landin ............... | H02K 1/04 310/44 |
| 6,499,209 B1 | 12/2002 | Landin et al. | |
| 6,844,646 B1 | 1/2005 | Werson et al. | |
| 6,867,513 B1 | 3/2005 | Werson et al. | |
| 7,075,402 B1 * | 7/2006 | Reyal ............. | C21D 8/1283 336/234 |
| 7,173,509 B2 | 2/2007 | Kumano et al. | |
| 2003/0011272 A1 * | 1/2003 | Kataoka ............ | H02K 3/522 310/156.47 |
| 2004/0046632 A1 | 3/2004 | Kumano et al. | |
| 2009/0004000 A1 | 1/2009 | Baumhauer et al. | |
| 2010/0283348 A1 * | 11/2010 | Okubo ............... | H02K 29/03 310/156.47 |
| 2011/0200816 A1 | 8/2011 | Mizrahi et al. | |
| 2015/0202844 A1 | 7/2015 | Böger et al. | |
| 2015/0328864 A1 | 11/2015 | Mizrahi et al. | |
| 2015/0372546 A1 * | 12/2015 | Büttner ............. | H02K 15/02 29/598 |

FOREIGN PATENT DOCUMENTS

| | | | | |
|---|---|---|---|---|
| CA | 2635639 A1 * | 12/2008 | ............. | F01D 25/04 |
| CN | 103166385 A * | 6/2013 | ............... | H02K 1/16 |
| DE | 1439897 A | 3/1969 | | |
| DE | 1514119 A | 5/1969 | | |
| EP | 0305966 A1 | 3/1989 | | |
| EP | 1220243 A2 | 7/2002 | | |
| EP | 1414132 B1 | 1/2003 | | |
| EP | 1967612 A1 | 9/2008 | | |
| GB | 1373096 A | 11/1974 | | |
| JP | 2002369470 A * | 12/2002 | | |
| JP | 2006254622 A * | 9/2006 | | |
| JP | 2008213410 A * | 9/2008 | | |
| JP | 4195964 B2 * | 12/2008 | | |
| JP | 41095964 B2 * | 12/2008 | | |
| JP | 2016163948 A * | 9/2016 | | |
| JP | 2016181981 A * | 10/2016 | | |
| JP | 2017054997 A * | 3/2017 | | |
| WO | WO-2009055626 A1 * | 4/2009 | ............... | H02K 5/08 |
| WO | 2014009114 A1 | 1/2014 | | |
| WO | WO-2014068041 A1 * | 5/2014 | ............. | B05D 5/083 |
| WO | WO-2018062409 A1 * | 4/2018 | ............. | C22C 38/00 |

OTHER PUBLICATIONS

Machine Translation JP2016181981 (Year: 2016).*
Translation of International Search Report received in corresponding application PCT/EP2019/056464, dated May 23, 2019.
ThyssenKrupp Steel Europe, Non grain oriented electrical steel PowerCore, Duisburg, Germany, Applicant Admitted Prior Art.
International Standard CEI IEC 404-2, Magnetic Materials, Part 2: Methods of measurement of the magnetic properties of electrical steel sheet and strip by means of an Epstein frame, 1996.
DIN EN ISO 6721-1, Plastics—Determination of dynamic mechanical properties, Part 1: General Principles, 2011.

* cited by examiner

*Primary Examiner* — Jose A Gonzalez Quinones
(74) *Attorney, Agent, or Firm* — Avek IP, LLC

(57) ABSTRACT

An electric motor with a beveled stator and/or rotor has at least one layer of a composite material. The composite material has at least one electrical steel strip layer as carrier and at least one polymer layer. The composite material can be used for reducing acoustic emission in beveled electric motors. A method of reducing acoustic emission in these electric motors is based on the use of the composite material.

22 Claims, No Drawings

ELECTRIC MOTOR WITH SLANTED STATOR AND/OR ROTOR CONTAINING AT LEAST ONE LAYER OF A COMPOSITE MATERIAL

CROSS REFERENCE TO RELATED APPLICATIONS

This application is a U.S. National Stage Entry of International Patent Application Serial No. PCT/EP2019/056464, filed Mar. 14, 2019, which claims priority to German Patent Application No. 10 2018 204 876.2, filed Mar. 29, 2018, the entire contents of both of which are incorporated herein by reference.

FIELD OF THE INVENTION

The invention relates to electric motors with a beveled stator and/or rotor containing at least one layer of a composite material.

SUMMARY

According to one embodiment, an electric motor has at least one of a beveled stator or rotor containing a composite material. The composite material includes at least one electrical steel strip layer as carrier and at least one polymer layer.

According to another embodiment, a method of reducing an acoustic emission of a beveled electric motor includes providing a beveled electric motor in which a stator and/or a rotor of the electric motor contains at least one layer of a composite material with at least one electrical steel strip layer as carrier and at least one polymer layer.

WRITTEN DESCRIPTION

The invention relates to all types of electric motors whereby there is continuous beveling of the stator, continuous beveling of the rotor, and rotor rotation in segments (particularly in the case of permanent magnet-excited synchronous machines). Furthermore, it is possible by means of a stator or rotor lamella section that changes continuously or in segments to generate a kind of beveling of the stator pole shoe and of the rotor surface. All variants are referred to hereinafter as "beveled electric motor".

The use of electric motors is nowadays widespread in order to avoid internal combustion engines and the problems associated therewith. This is increasing the demands of electric motors, especially in new fields of use. A disadvantage of conventional electric motors is their acoustic emission, which is of ever greater significance from the noise abatement point of view, including in the automobile sector. The electric motors used to date have been drowned out acoustically by the noise of the internal combustion engines.

Electromagnetic forces cause both rotor and stator to vibrate. This leads firstly to structure-borne sound, such that the electromagnetic inducement of force in electric motors generates inducement of noise and causes deformation of parts of the electric motor, for example rotor, stator and/or especially housing. Particularly the tension waves within the electric motor also cause parts of the motor to vibrate. This periodic deformation and movement of the housing, for example, leads to emission of airborne sound. Both structure-borne sound and airborne sound are perceived as being bothersome especially at high frequencies, i.e. as high tones. Furthermore, vibrations lead to unwanted stresses, movements, and fatigue in the material. The vibrations generated are transmitted to adjoining parts connected to the electric motor, where they likewise lead to stresses, movements, and fatigue in the material.

Attempts have been made to date to reduce the acoustic emission usually by insulating the housing and lining of the motors. Such an approach was followed, for example, in U.S. Pat. Nos. 6,844,646 and 6,867,513. However, these and similar approaches lead to an increase in total weight and are thus not very helpful for improvement in electrical mobility.

A further-developed approach is described in U.S. Pat. Nos. 6,191,510 and 6,499,209. The reduction of noise is based here on an internally insulated core of a stator, rotor or transformer, each of which has a vibration-damping material layer between 2 magnetic layers. The vibration-damping material layer used is a viscoelastic film of thickness about 25 μm, based on a crosslinked acrylic polymer.

However, the aim of further development remains optimization of acoustics without performance losses.

It is thus an object of the invention to provide electric motors that show reduced acoustic emission compared to the prior art and/or a control or to provide a method of reducing acoustic emission in electric motors. At the same time, there is to be no deterioration in other properties, for example an increase in weight, faster wear of parts connected to the electric motor, and the efficiency of the motors.

Furthermore, the development of oscillations and/or vibrations was to be suppressed at source and/or damping was to be effected as close as possible to the source, before they spread to other parts. This was to reduce or even eliminate the use of secondary acoustic measures.

More particularly, positive effects are to arise through combination of the substances used and construction of the motors; more preferably, synergistic effects should occur. Many of these measures are intended to lead to a reduction in weight and hence to an increase in the range of electrically driven automobiles.

Measures to date for improving the acoustic properties of electric motors have been achieved at the cost of efficiency. Moreover, primary sound reduction measures, for example an air gap between rotor and stator, are to be reduced in order to increase energy efficiency. The materials to be used are to show only low processing and handling costs. This is to be assured through a simple prototype construction in which mass production tools can be utilized.

It is a further object of the invention to overcome disadvantages of the prior art described above and/or to provide alternative solutions.

One execution of the invention relates to an electric motor with beveled rotor and/or stator containing at least one layer of a composite material, characterized in that the composite material includes at least one electrical steel strip layer as carrier and at least one polymer layer.

Electric motors may be classified into the following categories or classes: firstly synchronous machines: separately excited synchronous machines, permanent magnet-excited synchronous machines, synchronous reluctance machines, and transverse flow machines; and secondly asynchronous machines: induction machines with slip ring rotor or cage rotor. The motors mentioned may be executed either with or without beveling in the stator and in the rotor.

According to the invention, electric motors used are to be those in which there is continuous beveling of the stator, continuous beveling of the rotor and/or rotor rotation in segments (particularly in the case of permanent magnet-excited synchronous machines). In addition, motors used are those in which a stator or rotor lamella section that changes continuously or in segments generates a kind of beveling of the stator pole shoe and of the rotor surface.

For avoidance of eddy current losses, stator and rotor are produced from laminated cores composed of a multitude of thin metal sheets, called lamellae, that are electrically insulated from one another. A rotor and/or stator to be used in accordance with the invention is thus constructed from lamellae, i.e. multiple layers. In an alternative, these layers are arranged at right angles to the axis of rotation of the rotor. In a further alternative, the layers are arranged parallel to the axis of rotation of the rotor. Preference is given in accordance with the invention to using the alternative with the lamellae arranged at right angles to the axis of rotation.

The electric motor of the invention may be executed as an external rotor or bell-type rotor (rotor on the outside) or as an internal rotor (rotor within the stator). Preference is given to the alternative with an internal rotor.

One embodiment of the invention relates to a beveled electric motor having at least one layer of a composite material. The composite material has a further electrical steel strip layer as cover sheet, and therefore comprises a first and a second electrical steel strip layer and a polymeric layer disposed in between.

In a further execution, the beveled electric motor is characterized in that the polymer layer comprises or consists of a shear deformation-absorbing polymer.

In the context of the invention, a shear deformation-absorbing polymer is a polymer that absorbs shear deformation. The reference used is always the axis of rotation of the rotor in the respective electric motor. More specifically, shear deformation is described as deformation of the polymer layer on account of a mode of torsion. This is apparent from the superimposition of a second-order (or higher-order) mode in radial direction and a first-order (possibly higher-order) mode in axial direction.

A non-beveled electric motor in operation generates radial vibrations in relation to the axis of rotation (preferably the axis of the rotor). These vibrations can be transmitted to the housing. If the amplitudes of these radial vibrations in a plane at right angles to the axis of rotation are combined, the result is oval or ovoid forms, in accordance with the number of amplitudes detected. In the case of beveled electric motors, the vibrations, as well as the radial components, also have an axial phase shift. An axial phase shift in the context of the invention is a component parallel to the axis of rotation. This is a direct axial component.

In the context of the invention, an axial component is also a change in at least one feature of the radial vibration along the axis of rotation. The features are selected from the group comprising or consisting of amplitude, frequency and phase shift, and the shape of the amplitudes of the radial vibration in a plane at right angles to the axis of rotation, found as described above.

According to the invention, the composite material has a layer thickness in the range from 3 to 20 μm.

The composite material to be used in accordance with the invention, compared to composite materials known from the prior art, has defined soft-magnetic properties in the region of monolithic electrical steel strip materials.

The composite material preferably has specific transmagnetization losses in the range from 0.7 to 7 W/kg at P1.0; 50 Hz and in the range from 1.9 to 15 W/kg at P1.5; 50 Hz and/or polarization in the range from 1.49 T to 1.7 T at J2500 and in the range from 1.6 T to 1.8 T at J5000, ascertained to DIN EN 60404-2.

In some embodiments, the composite material has specific transmagnetization losses in the range from 1.0 to 1.5 W/kg at P1.0; 50 Hz and in the range from 2.4 to 3.3 W/kg at P1.5; 50 Hz and/or polarization in the range from 1.49 to 1.57 T at J2500 and in the range from 1.60 to 1.65 T at J5000, ascertained to DIN EN 60404-2.

In some embodiments, the composite material may have specific transmagnetization losses in the range from 1.3 to 1.5 W/kg at P1.0; 50 Hz and in the range from 2.8 to 3.3 W/kg at P1.5; 50 Hz and/or polarization in the range from 1.49 to 1.55 T at J2500 and in the range from 1.60 to 1.65 T at J5000. In other embodiments, the composite material may have specific transmagnetization losses in the range from 1.35 to 1.5 W/kg at P1.0; 50 Hz and in the range from 3.0 to 3.3 W/kg at P1.5; 50 Hz and/or polarization in the range from 1.49 to 1.57 T at J2500 and in the range from 1.60 to 1.65 T at J5000. In still other embodiments, the composite material may have specific transmagnetization losses in the range from 1.0 to 1.1 W/kg at P1.0; 50 Hz and in the range from 2.4 to 2.8 W/kg at P1.5; 50 Hz and/or polarization in the range from 1.52 to 1.54 T at J2500 and in the range from 1.61 to 1.63 T at J5000, determined to DIN EN 60404-2.

The composite material for use in accordance with the invention, in the field of use of a stator pack and/or rotor pack, has a comparable iron fill factor (as described below). The iron fill factor in a stator pack and/or rotor pack using the composite material of the invention may be in the range of 96.0% to 99.0%. The range may be, more particularly 97.8% to 99.0%, 98.3% to 98.9%, or even 98.5% to 98.8%.

The use of the composite material not only allows the structure-borne sound that arises in the electric motor to be significantly reduced in an active manner, but additionally generates either a further cost advantage and/or elevated efficiency through variation, for example, in the electrical steel strip thicknesses used.

The composite material prevents and/or damps the vibrations generated at source. This prevents transmission to the housing. The structure-borne sound generated by the electric motor, but additionally also the airborne sound generated by the housing, is distinctly reduced as a result. Therefore, there is a reduction in acoustic emission of the entire electric motor.

The effectiveness of the reduction in acoustic emission can additionally be enhanced by interaction with engine-specific features and may (possibly) lead to logistic effects.

The specific transmagnetization losses of electrical steel strips depend very significantly on the thicknesses or on the cross section of the strip materials used. The rule of thumb is that the smaller the layer thickness of the electrical steel strip, the lower the eddy current losses and hence the specific transmagnetization losses. The use of the composite sheet of the invention—by comparison with a monolithic electrical steel strip having a thickness of, for example, 0.5 mm—allows two electrical steel strips of the same quality with a thickness of 0.25 mm to be bonded to one another. Based on one type of motor, it is thus possible to either significantly increase the efficiency of the motor or to enable the building of a smaller motor with the same efficiency. The latter would bring an advantage in terms of weight. In addition, it is also possible to use electrical steel strip of lower quality. In this way, it is possible to produce a motor with the same efficiency which is producible less expensively compared to the above type of motor.

In practice, the composite materials themselves, and also the components produced therefrom, come into contact to some degree with different oils, some of them very aggressive, that can attack the polymeric layer and hence lead to delamination. It is therefore desirable for the polymeric layer to be stable to such industrial oils.

In an alternative, the polymer layer is a viscoelastic material and contains or consists essentially of a viscoelastic polymer. In the context of the invention, the word "essentially" means that at least 50%, 55%, 60%, 65%, 70%, 72%, 74%, 76%, 78%, 80%, 82%, 84%, 86%, 88%, 90%, 91%, 92%, 93%, 94%, 95%, 96%, 97%, 98%, 99% or 100% (volume or percent by weight) of a material, the viscoelastic material here for example, consists of a particular substance, viscoelastic polymer here.

The polymers may be isotropic materials in one alternative, anisotropic materials in a further alternative, especially with regard to their elastic properties.

In one execution of the invention, viscoelastic polymers are used that are selected from the group comprising or consisting of: urethane rubbers, fluorine-based elastomers, fluorine-based rubbers, silicone rubbers, nitrile rubbers, butyl rubbers, acrylic rubbers, natural rubbers, styrene-butadiene rubbers, polyesters, polyurethanes, polyamides, ethylene-vinyl acetate copolymers, polyvinylbutyral, polyvinylbutyral-polyvinylacetate copolymers and epoxy-acrylate networks and combinations thereof. In some embodiments, polyesters, polyurethanes, polyamides and combinations thereof may be preferred.

In a further execution, thermoplastic polymers are used that are selected from the group consisting of polyacrylates, polycarbonates, polyetherimides, polyesters, polysulfones, polystyrenes, acrylonitrile-butadiene-styrene block copolymers, polypropylenes, acetal polymers, polyamides, polyvinylchlorides, polyethylenes, polyurethanes and combinations thereof. In some embodiments, polyesters, polyurethanes, polyamides and combinations thereof contains or consists thereof may be preferred.

In embodiments, the polymers are also crosslinkable in order to increase their strength. Typically, these are classified as heat-curable or radiation-curable resins. Such a resin is in a thermoplastic state prior to the production of the composite material. During the production process, the heat-curable or radiation-curable resin is typically cured and/or crosslinked to give a solid state. Depending on the specific resin used, there may be at least one curing agent present, for example a catalyst, which, on exposure to a suitable energy source (such as thermal energy or radiation, for example IR-, UV-, x-rays, electron beams), initiates the polymerization of the heat-curable resin. Particularly preferred viscoelastic polymers are those based on acrylates.

According to the invention, it is also possible to use mixtures of any of the above polymers, or starting materials thereof.

In embodiments, the polymer used is an acrylate-based copolymer, which may have a high molecular weight and/or be in crosslinked form. In particular, a copolymer composed of a copolymerized mixture of at least one alkyl acrylate ester monomer unit and/or alkyl methacrylate ester monomer unit, each of which has an alkyl group having 1 to 12 carbon atoms, a glycidyl monomer unit, an unsaturated carboxylic acid monomer unit and a crosslinker is used in accordance with embodiments of the invention. There is no apparent swelling of the polymeric layer here, or delamination of the composite material.

What is meant by acrylate-based in the context of the invention is that the reactant used is essentially an acrylate (with the definition of the word "essentially" as described above). In addition, the percentages, in one alternative, relate to the molar ratio. Acrylate refers in accordance with the invention to a reactant selected from the group comprising or consisting of: acrylic acid, methacrylic acid, (meth)acrylic ester having an alkyl group having one to 12 carbon atoms, preferably 4-12; or mixtures thereof.

In some embodiments, the crosslinked, high molecular weight acrylate-based copolymer is composed exclusively of the two components: the copolymerized mixture and the crosslinker. In other embodiments, the copolymerized mixture consists of at least one alkyl acrylate ester monomer unit and/or alkyl methacrylate ester monomer unit, each of which has an alkyl group having 1 to 12 carbon atoms, a glycidyl monomer unit and an unsaturated carboxylic acid monomer unit.

The glycidyl monomer unit may be selected from the group comprising or consisting of allyl glycidyl ether, glycidyl acrylate ester, glycidyl methacrylate ester and/or mixtures thereof.

Preferably, the alkyl acrylate ester monomer unit and/or alkyl methacrylate ester monomer unit has an alkyl group having 4 to 12 carbon atoms.

If the polymeric layer has a glass transition temperature higher than −15° C., an alkyl acrylate ester monomer unit and/or alkyl methacrylate ester monomer unit having an alkyl group having 1 to 4 carbon atoms may be added.

In embodiments, the crosslinked, high molecular weight, acrylate-based copolymer is composed of a copolymerized mixture of at least 55% to 85% by weight of an alkyl acrylate ester monomer unit and/or alkyl methacrylate ester monomer units, each of which has an alkyl group having 4 to 12 carbon atoms, 0% to 35% by weight of an alkyl acrylate ester monomer unit and/or alkyl methacrylate ester monomer unit, each of which has an alkyl group having 1 to 4 carbon atoms, 0.01% to 2% by weight of a glycidyl monomer unit, 1% to 15% by weight, more preferably 3% to 13% by weight, of an unsaturated carboxylic acid monomer unit, and 0.05% to 1% by weight of a crosslinker.

Preferably, the copolymerized mixture has an average molar mass in the range from 500 to 1500 kDa. In some embodiments, the copolymerized mixture has an average molar mass in the range from 600 to 1000 kDa, 700 to 900 kDa, or 800 kDa±20 kDa. Average molar mass is ascertained here by means of GPC. Polystyrene standard was used for calibration.

The alkyl acrylate ester monomer unit and/or alkyl methacrylate ester monomer unit having an alkyl group having 4 to 12 carbon atoms may be selected from 2-ethylhexyl acrylate, isooctyl acrylate, butyl acrylate, 2-methylbutyl acrylate, 4-methyl-2-pentyl acrylate, isodecyl methacrylate, methyl acrylate, ethyl acrylate, methyl methacrylate and/or a mixture thereof.

The unsaturated carboxylic acid monomer unit may be selected from acrylic acid, methacrylic acid, fumaric acid and/or a mixture thereof. Preferred mixtures are composed of acrylic acid and methacrylic acid, of acrylic acid and fumaric acid, or of methacrylic acid and fumaric acid.

In embodiments, the copolymerization is performed with the aid of a solvent mixture, such as a mixture of ethyl acetate and acetone. The solvent mixture may have a ratio that permits reflux in the range from 68 to 78° C. The solids content during the copolymerization may be the range from 40% to 60% by weight.

For the copolymerization, preference is given to using AIBN as free-radical initiator. In addition, the copolymerization is preferably conducted under a nitrogen atmosphere, so as to achieve a copolymer of high molecular weight, preferably having an average molar mass of ≥500 kDa.

The crosslinker may be selected from aluminum acetylacetonate (AlACA), iron acetylacetonate (FeACA), titanium acetylacetonate (TiACA) or zirconium acetylacetonate (ZrACA).

In further embodiments, the electrical steel strip layer has a layer thickness in the range from 50 to 1500 µm, 50 to 1000 µm, 50 to 750 µm, or 50 to 650 µm.

For production of the composite material to be used in accordance with the invention, it is possible to use two electrical steel strip layers of equal or different thickness. The electrical steel strip is preferably a non-grain-oriented electrical steel strip.

In order to avoid short circuits between two electrical steel strips, the electrical steel strip layers may be provided with an insulation layer in order to achieve electrical shielding. The electrical steel strip layer may have an insulation layer having a layer thickness in the range from 0.5 to 5 µm, 0.5 to 1.5 µm, or 1.0 to 1.5 µm.

The insulation layer may consist of an organic polymer, for example an acrylate resin, alkyd resin, epoxy resin, melamine resin, phenolic resin, polyamide resin, polyester resin and polyurethane resin, or a mixture thereof. In another preferred variant, the organic polymer may contain further in organic components, for example aluminum phosphate, pigments and/or fillers, for example titanium dioxide, barium sulfate, calcium carbonate (kaolin), silicon dioxide or zinc sulfide.

In some variants of the invention, the insulation layer consists of a thermally activatable adhesive.

In embodiments, the polymeric layer has a layer thickness in the range from 3 to 10 µm, 4 to 8 µm, or 4.5 to 7.5 µm.

In embodiments, the composite material for use in accordance with the invention is produced in a continuous method comprising the following method steps: (1) providing a first electrical steel strip layer; (2) coating the first electrical steel strip layer with a polymeric composition consisting of a high molecular weight acrylate-based copolymer and a crosslinker; (3) heating the coated first electrical steel strip layer; (4) providing and heating a second electrical steel strip layer; and (5) laminating the two electrical steel strip layers so as to obtain a composite material having a polymeric layer consisting of a crosslinked, high molecular weight, acrylate-based copolymer having a layer thickness in the range from 3 to 20 µm.

The first electrical steel strip layer and the second electrical steel strip layer may be provided in the form of a coil.

The first electrical steel strip layer may be coated by means of a coater. In this way, a homogeneous layer of the polymeric composition is applied to the first electrical steel strip layer. The application is effected in such a way that the composite material, after the lamination step, has a polymeric layer having a layer thickness in the range from 3 to 20 µm, 3 to 10 µm, 4 to 8 µm, or 4.5 to 7.5 µm.

In embodiments, the uncoated side of the electrical steel strip is coated with the polymeric composition.

In further embodiments, a pretreatment of the first electrical steel strip layer takes place between the step of providing the first electrical steel strip layer and the applying of the polymeric layer. The pretreatment is preferably a cleaning operation. In this operation, the surface of the electrical steel strip used is freed of adhering soil particles and oils and hence prepared for the application of the polymeric composition.

In embodiments, the high molecular weight, acrylate-based copolymer is formed from a copolymerized mixture of at least one alkyl acrylate ester monomer unit and/or alkyl methacrylate ester monomer unit, each of which has an alkyl group having 1 to 12 carbon atoms, a glycidyl monomer unit, and an unsaturated carboxylic acid monomer unit.

Electrical steel strip layers may be heated to a temperature in the range from 150 to 250° C., 160 to 190° C., or more specifically in the range from 175 to 185° C. The electrical steel strip layers can be heated by means of conventional ovens or by means of induction. Corresponding techniques are known to the person skilled in the art.

The two heated electrical steel strip layers may be laminated by means of a laminator station. The first electrical steel strip layer to which the polymeric composition has been applied is combined here with the second electrical steel strip layer, so as to obtain the composite material of the invention. The still-hot composite material generally passes through a cooling zone, where it is cooled down to room temperature and then wound to give a coil.

In embodiments, in a next process stage, a thermally activatable adhesive is applied by means of a coil-coating method to one side, more preferably to both sides, of the composite material. This can be applied to the composite material over part of the area, more preferably over the full area.

A composite material produced in such a way may have soft-magnetic properties in the region of monolithic electrical steel strips compared to composite materials known from the prior art. The composite material preferably has a specific transmagnetization loss in the range from 0.7 to 7 W/kg at P1.0; 50 Hz and in the range from 1.9 to 15 W/kg at P1.5; 50 Hz and/or polarization in the range from 1.49 to 1.7 T at J2500 and in the range from 1.6 to 1.8 T at J5000, ascertained to DIN EN 60404-2.

In embodiments, the composite material has a specific transmagnetization loss in the range from 1.0 to 1.5 W/kg at P1.0; 50 Hz and in the range from 2.4 to 3.3 W/kg at P1.5; 50 Hz and/or polarization in the range from 1.49 to 1.57 T at J2500 and in the range from 1.60 to 1.65 T at J5000, ascertained to DIN EN 60404-2. In further embodiments, the composite material has a specific transmagnetization loss in the range from 1.3 to 1.5 W/kg at P1.0; 50 Hz and in the range from 2.8 to 3.3 W/kg at P1.5; 50 Hz and/or polarization in the range from 1.49 to 1.55 T at J2500 and in the range from 1.60 to 1.65 T at J5000. In other embodiments, the composite material has a specific transmagnetization loss in the range from 1.35 to 1.5 W/kg at P1.0; 50 Hz and in the range from 3.0 to 3.3 W/kg at P1.5; 50 Hz and/or polarization in the range from 1.49 to 1.57 T at J2500 and in the range from 1.60 to 1.65 T at J5000. In still other embodiments, the composite material has a specific transmagnetization loss in the range from 1.0 to 1.1 W/kg at P1.0; 50 Hz and in the range from 2.4 to 2.8 W/kg at P1.5; 50 Hz and/or polarization in the range from 1.52 to 1.54 T at J2500 and in the range from 1.61 to 1.63 T at J5000, ascertained to DIN EN 60404-2.

The composite material to be used in accordance with the invention is processed further to give a stator pack and/or rotor pack comprising a multitude of layers of the composite material, wherein the composite material is present in the form of the lamellae described above. Such a stator pack and/or rotor pack may have a homogeneous or heterogeneous construction. A homogeneous construction consists of a multitude of layers of the composite material. A heterogeneous construction consists of a multitude of layers, i.e. lamellae, of the composite material to be used in accordance with the invention and monolithic electrical steel strip layers arranged in between. For example, the construction may have an arrangement in which every third layer consists of a monolithic electrical steel strip. In one alternative, the pack may also have just one, at least one, at least 2, 3, 4, 5, 6, 7, 8, 9, 10, 11, 12, 13, 14, 15, 16, 17, 18, 20, 21, 22, 23, 24, 25, 26, 27, 28, 29, 30, 31, 32, 33, 34, 35, 36, 37, 38, 39, 40 or more layers, up to 10,000 individual lamellae (layers).

In a further aspect, the invention relates to a beveled electric motor comprising an above-described stator pack and/or rotor pack.

In a further aspect, the present invention relates to a generator containing an above-described stator pack and/or rotor pack.

In alternatives, the above-described stator pack and/or rotor pack is produced in a method comprising the steps of: (1) providing a composite material of the invention; (2) separating a multitude of lamellae from the composite material; and (3) bonding the lamellae to form a stator pack and/or rotor pack.

The lamellae can be separated from the composite material, preferably in the form of a coil, for example, by means of a suitable punching or cutting tool or by laser cutting. The lamellae separated are stacked to form a pack either during the separation process or subsequently and bonded to one another.

By virtue of a composite material already having been provided, optionally in the form of a coil, a process advantage arises in the separating operation compared to the production of the stator pack and/or rotor pack using a monolithic electrical steel strip since provision of a stator pack and/or rotor pack with the same thickness requires only half of the separation steps.

The lamellae (layers) may be bonded by means of punch bundling, wherein a mechanical bond is generated between the individual lamellae. This bond is formed by elevations that are punched into the individual lamellae.

In embodiments, the individual lamellae are bonded to one another. Preference is given to bonding using a thermally activatable adhesive. Bonding can be effected over part of the area, more preferably over the full area, with the thermally activatable adhesive. This can be activated before, during, or after the stacking of the lamellae. It is thus possible to activate the thermally activatable adhesive via the various process steps and hence bring it into a tacky state, such that there is a time delay and/or separation in space.

As an alternative, it is also possible to use a baking varnish or a spot adhesive bond for bonding of the lamellae.

The rotor pack and/or stator pack thus produced is equipped with the appropriate magnets or windings or cages and installed in the housing of the electric motor and connected.

One execution of the invention relates to a beveled electric motor with composite material, wherein the composite material has damping in the range from 0.01-0.2, 0.015-0.1, 0.02-0.03, or 0.022-0.025 at 20° C. and 50 Hz; 0.01-0.2, 0.02 to 0.1, 0.025-0.05, or 0.028-0.035 at 20° C. and 500 Hz; 0.01-0.1, 0.015-0.05, 0.017-0.025, or 0.018-0.02 at −10° C. and 200 Hz; and 0.01-0.3, 0.02-0.2, 0.04-0.15, or 0.06-1.0 at 30° C. and 1000 Hz.

Damping is determined in the context of the invention via the abovementioned loss factor expressed according to standard EN ISO 6721. This is the damping of structure-borne sound in the event of mechanical/acoustic vibrations, i.e. what is called structure-borne sound damping.

In embodiments, the beveled electric motor has a decrease in acoustic emission in the frequency range of 20-20 000 Hz in comparison to a control.

In alternative embodiments, the electric motor has a reduction in acoustic emission compared to a control of 0.1-20 dB, 0.5-18 dB, 0.5-15 dB, 0.1-20 dB, 1-15 dB, 1-20 dB, 1 to 10 dB, in particular 1.0 to 9 dB, 1-8, 1.7, 1-6, 1-5, 1-4, 1.3, or 1-2 dB.

In a further execution of the invention, the electric motor has damping, i.e. system damping in the mass-spring-damper system, or a damping factor (at room temperature) of 0.035-1.0, 0.45-1.0, 0.55-0.9, or 0.6-0.7, in a frequency range of 820-1000 Hz, preferably 850-900 Hz. In alternatives, the electric motor has a damping factor of 0.045-1.0, 0.5-1.0, 0.55-0.9, or 0.6-0.8, in a frequency range between 820 and 1000 Hz, preferably 850 and 900 Hz. In further alternatives, the beveled electric motor of the invention has an increase in the damping factor in the range between 870 and 1000 Hz, preferably 880 and 950 Hz, by 100-1000%, 150-800%, 200-600%, or 300-500%, compared to a control.

A control in the context of the invention is an electric motor that preferably differs from the electric motor of the invention in just one feature; the distinction feature is selected from the group comprising or consisting of: material from which the lamellae of the rotor and/or stator are made, beveled versus non-beveled electric motor, composition of the polymer layer of the lamellae, sequence of different types of lamellae, engine load, operating temperature etc.

The invention further provides for the use of a composite material with at least one electrical steel strip layer as carrier and at least one polymer layer for reducing the acoustic emission of a beveled electric motor.

For this purpose, a composite material to be used in accordance with the invention is used as described above in the construction of a rotor and/or stator for a beveled electric motor; in particular, the composite material described above is used as lamellae in the rotor and/or stator. At least one lamellae here, i.e. one layer, consists of the above-described composite material; preferably, two or more such layers are used; in particular, the entire rotor and/or stator is constructed from lamellae of the composite material to be used in accordance with the invention.

The invention further relates to a method of reducing acoustic emission of a beveled electric motor, characterized in that the stator and/or rotor of the electric motor contains at least one layer of a composite material with at least one electrical steel strip layer as carrier and at least one polymer layer. The incorporation of the at least one layer of the composite material or the use thereof in an electric motor is described above.

The beveled electric motors of the invention are generally to be used as automotive drive motors. In addition, it is possible on the basis of the present invention to modify conventional beveled electric motors in the context of the invention by replacing individual to all lamellae of the rotor and/or stator with the above-described composite material for use in accordance with the invention.

In executions of the invention, for determinations or analysis of the properties and features of the beveled electric motor of the invention, the mode of action of a standardized, inexpensive machine is examined. For example, an asynchronous machine which is preferably subject only to low thermal stress in the stator is examined. The control used is an unchanged machine, i.e. a commercial beveled electric motor with the following properties, for example: 6-pole asynchronous machine, stator diameter 170 mm, rotor diameter 115 mm, effective length 150 mm. In general, such a control should be selected as close as possible to the application for use in an automobile. In one case: an asynchronous machine, especially since they are more acoustically sensitive than PSMs, and show lower stiffness. Preference is given to a standardized industrial machine.

The electric motor to be used in accordance with the invention is the same motor or an identical motor in which at least one layer, lamella of the rotor or stator, is replaced by the composite material to be used in accordance with the invention. The electric motor is assembled again and connected. At least one measurement point, preferably multiple measurement points, for determination of acoustic emission are fixed on the housing. In this way, structure-borne sound is determined. In addition, by means of a microphone, airborne sound, or sound pressure, sound pressure level, can be determined at a fixed distance.

In one alternative, the analysis can also be effected in a simulation on a model parametrized beforehand, on the basis of the control. For this purpose, as well as measurement points, excitation points are also determined.

The motors of the invention show a distinct reduction in acoustic emission compared to the control over a broad frequency range, particularly under stress, for example startup of the engine or acceleration.

The invention claimed is:

1. An automotive electric drive motor, the electric motor comprising at least one of a skewed stator and rotor containing at least one layer of a composite material, the composite material comprising at least one electrical steel strip layer as carrier and at least one polymer layer, wherein the at least one of a skewed stator and rotor comprises a plurality of lamellae which skew continuously and generate at least one of a skew of a stator pole shoe and a skew of a rotor surface.

2. The skewed electric motor as claimed in claim 1, characterized in that the composite material includes a further electrical steel strip layer as cover sheet.

3. The skewed electric motor as claimed in claim 2, characterized in that the polymer layer contains a shear deformation-absorbing polymer.

4. The skewed electric motor as claimed in claim 3, characterized in that the polymer layer has a layer thickness in the range of 3-20 µm.

5. The skewed electric motor as claimed in claim 4, characterized in that the electrical steel strip layer has a layer thickness in the range of 50-1500 µm.

6. The skewed electric motor as claimed in claim 5, characterized in that the composite material has structure-borne sound damping in the range of 0.01-0.2 at 20° C. and 50 Hz; 0.01-0.2 at 20° C. and 500 Hz; 0.01-0.1 at −10° C. and 200 Hz and 0.01-0.3 at 30° C. and 1000 Hz.

7. The skewed electric motor as claimed in claim 6, characterized in that the composite material has a specific transmagnetization loss of in the range from 0.7 to 7 W/kg at P1.0; 50 Hz and in the range from 1.9 to 15 W/kg at P1.5; 50 Hz and a polarization in the range from 1.49 to 1.7 T at J2500 and in the range from 1.6 to 1.8 T at J5000, ascertained to DIN EN 60404-2.

8. The skewed electric motor as claimed in claim 7, characterized in that electric motor has a reduction in acoustic emission in the frequency range from 20 to 20 000 Hz of at least 1 dB in comparison to a control.

9. A method of reducing the acoustic emission of a skewed electric drive motor for an automobile, comprising providing a skewed electric motor in an automobile, the electric motor having at least one of a stator and a rotor, wherein:

the at least one of the stator and the rotor contains at least one layer of a composite material, the composite material comprising at least one electrical steel strip layer as carrier and at least one polymer layer; and the at least one of a skewed stator and rotor comprises a plurality of lamellae which skew continuously and generate at least one of a skew of a stator pole shoe and a skew of a rotor surface.

10. The skewed electric motor as claimed in claim 1, characterized in that the composite material has structure-borne sound damping in the range of 0.01-0.2 at 20° C. and 50 Hz; 0.01-0.2 at 20° C. and 500 Hz; 0.01-0.1 at −10° C. and 200 Hz and 0.01-0.3 at 30° C. and 1000 Hz.

11. The skewed electric motor as claimed in claim 5, characterized in that the composite material has structure-borne sound damping in the range of 0.01-0.2 at 20° C. and 50 Hz; 0.01-0.2 at 20° C. and 500 Hz; 0.01-0.1 at −10° C. and 200 Hz or 0.01-0.3 at 30° C. and 1000 Hz.

12. The skewed electric motor as claimed in claim 11, characterized in that the composite material has a specific transmagnetization loss of in the range from 0.7 to 7 W/kg at P1.0; 50 Hz and in the range from 1.9 to 15 W/kg at P1.5; 50 Hz and a polarization in the range from 1.49 to 1.7 T at J2500 and in the range from 1.6 to 1.8 T at J5000, ascertained to DIN EN 60404-2.

13. The skewed electric motor as claimed in claim 11, characterized in that the composite material has a specific transmagnetization loss of in the range from 0.7 to 7 W/kg at P1.0; 50 Hz and in the range from 1.9 to 15 W/kg at P1.5; 50 Hz or a polarization in the range from 1.49 to 1.7 T at J2500 and in the range from 1.6 to 1.8 T at J5000, ascertained to DIN EN 60404-2.

14. The skewed electric motor as claimed in claim 13, characterized in that electric motor has a reduction in acoustic emission in the frequency range from 20 to 20 000 Hz of at least 1 dB in comparison to a control.

15. The skewed electric motor as claimed in claim 12, characterized in that electric motor has a reduction in acoustic emission in the frequency range from 20 to 20 000 Hz of at least 1 dB in comparison to a control.

16. The skewed electric motor as claimed in claim 1, characterized in that the composite material has structure-borne sound damping in the range of 0.01-0.2 at 20° C. and 50 Hz; 0.01-0.2 at 20° C. and 500 Hz; 0.01-0.1 at −10° C. and 200 Hz or 0.01-0.3 at 30° C. and 1000 Hz.

17. The skewed electric motor as claimed in claim 6, characterized in that the composite material has a specific transmagnetization loss of in the range from 0.7 to 7 W/kg at P1.0; 50 Hz and in the range from 1.9 to 15 W/kg at P1.5; 50 Hz or a polarization in the range from 1.49 to 1.7 T at J2500 and in the range from 1.6 to 1.8 T at J5000, ascertained to DIN EN 60404-2.

18. The skewed electric motor as claimed in claim 1, characterized in that the composite material has a specific transmagnetization loss of in the range from 0.7 to 7 W/kg at P1.0; 50 Hz and in the range from 1.9 to 15 W/kg at P1.5; 50 Hz or a polarization in the range from 1.49 to 1.7 T at J2500 and in the range from 1.6 to 1.8 T at J5000, ascertained to DIN EN 60404-2.

19. The skewed electric motor as claimed in claim 1, characterized in that the composite material has a specific transmagnetization loss of in the range from 0.7 to 7 W/kg at P1.0; 50 Hz and in the range from 1.9 to 15 W/kg at P1.5; 50 Hz and a polarization in the range from 1.49 to 1.7 T at J2500 and in the range from 1.6 to 1.8 T at J5000, ascertained to DIN EN 60404-2.

20. The skewed electric motor as claimed in claim 1, characterized in that electric motor has a reduction in acoustic emission in the frequency range from 20 to 20 000 Hz of at least 1 dB in comparison to a control.

21. The skewed electric motor as claimed in claim 1, characterized in that the stator and/or rotor using the composite material has an iron fill factor in the range of 96-99%.

22. The skewed electric motor as claimed in claim 1, characterized in that the polymer is a copolymer composed of a copolymerized mixture of at least one alkyl acrylate ester monomer unit and/or alkyl methacrylate ester monomer unit, each of which has an alkyl group having 1 to 12 carbon atoms, a glycidyl monomer unit, an unsaturated carboxylic acid monomer unit and a crosslinker.

* * * * *